United States Patent
Prasad et al.

(10) Patent No.: US 6,818,048 B2
(45) Date of Patent: *Nov. 16, 2004

(54) INK-JET INKS FOR IMPROVED IMAGE QUALITY AND RELIABILITY

(75) Inventors: Keshava A. Prasad, San Marcos, CA (US); Amiya K. Chatterjee, San Diego, CA (US); John M. Gardner, San Diego, CA (US); Anne M. Kelly-Rowley, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 10/001,637

(22) Filed: Oct. 30, 2001

(65) Prior Publication Data

US 2004/0154497 A9 Aug. 12, 2004

Related U.S. Application Data

(63) Continuation-in-part of application No. 10/000,043, filed on Oct. 29, 2001.

(51) Int. Cl.$^7$ .............................................. C09D 11/02
(52) U.S. Cl. .................................................. 106/31.58
(58) Field of Search ...................... 106/31.58

(56) References Cited

U.S. PATENT DOCUMENTS

| | | | |
|---|---|---|---|
| 5,165,968 A | 11/1992 | Johnson et al. ............. | 427/288 |
| 5,364,461 A | 11/1994 | Beach et al. ............. | 106/31.58 |
| 5,788,754 A * | 8/1998 | Deardurff et al. ......... | 106/31.58 |
| 5,858,075 A | 1/1999 | Deardurff et al. ......... | 106/31.27 |
| 5,955,515 A * | 9/1999 | Kimura et al. ............. | 523/161 |
| 5,981,623 A * | 11/1999 | McCain et al. ............. | 523/160 |
| 6,187,086 B1 * | 2/2001 | Rehman ................... | 106/31.86 |
| 6,372,818 B1 * | 4/2002 | Kimura et al. ............. | 523/161 |
| 6,379,441 B1 * | 4/2002 | Kanaya et al. ............ | 106/31.49 |
| 6,511,170 B1 * | 1/2003 | Gallo et al. ................. | 347/100 |

FOREIGN PATENT DOCUMENTS

| | | | |
|---|---|---|---|
| EP | 1041127 A1 * | 10/2000 | ........... C09D/11/00 |
| EP | 1142967 A2 | 10/2001 | |

* cited by examiner

*Primary Examiner*—Mark L. Bell
*Assistant Examiner*—Veronica F. Faison

(57) ABSTRACT

The present invention provides ink-jet inks for ink-jet printing, comprising from 0.1% to 5% by weight of at least one dye; from 8% to 20% by weight of a diol selected from the group consisting of 1,2-pentanediol, 1,2-hexanediol, and combinations thereof; from 0.1% to 5% by weight of an aliphatic alcohol or aliphatic alcohol mixture; and from 0.1% to 1.5% by weight of at least one component independently selected from the group consisting of buffers, biocides, and metal chelators, with the proviso that no surfactant is present in the ink-jet ink composition. The ink-jet inks formulated according to the present invention provide good dot size, color-to-color bleed alleviation, improved coalescence, less chia, and improved print head materials compatibility.

18 Claims, No Drawings

INK-JET INKS FOR IMPROVED IMAGE QUALITY AND RELIABILITY

"The following application is a continuation in part of U.S. patent application Ser. No. 10/000,043, which was filed on Oct. 29, 2001."

FIELD OF THE INVENTION

The present invention relates generally to ink-jet inks having improved image quality and reliability.

BACKGROUND OF THE INVENTION

Thermal ink jet printers provide an effective means of propelling ink jet inks onto various media including paper. These printers can accomplish this by using resistive heater elements for heating the ink to a boil, and propelling the ink through an overlying orifice plate. Specifically, a typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor located opposite the nozzle so ink can collect between the firing resistor and the nozzle. Upon energizing a particular resistor element, a droplet of ink is expelled through the nozzle toward a print medium. Such printers, as typified by the Hewlett-Packard DeskJet™ and DesignJet™ printers, are desirable for use for several reasons. For example, thermal ink jet printers have a relatively fast throughput while being relatively inexpensive to run. Additionally, these printers are relatively easy to use, and the ink is easily replaced.

There are several reasons that ink-jet printing has become a popular way of recording images on various media surfaces, particularly paper. Some of these reasons include low printer noise, capability of high speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, new applications, etc. As new ink-jet inks are developed, there are several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long-term storage stability, good dot size and dot gain, color-to-color bleed alleviation, less chia, acceptable coalescence, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Ink-jet ink compositions have tended to become more and more complicated as demands for print quality have increased. In U.S. Pat. No. 5,788,754, an ink-jet ink composition is described that exhibits some desired properties of good ink-jet inks. For example, when printed on gelatin-coated media, excellent color-to-color bleed alleviation, good dot gain, good dot size, etc., are observed. However, the formulation is somewhat complicated having a large number of components. Thus, it is recognized that it would be desirable to formulate ink-jet inks that provide some of the same advantages of the inks of the prior art, while at the same time providing ink-jet ink formulations that are simpler to manufacture and less aggressive toward materials used in typical printheads.

SUMMARY OF THE INVENTION

The present invention provides an ink-jet ink for ink-jet printing, consisting of from 0.1% to 5% by weight of at least one dye; from 8% to 20% by weight of an organic solvent selected from the group consisting of 1,2-pentanediol, 1,2-hexanediol, and combinations thereof; from 0.1% to 5% by weight of an aliphatic alcohol or aliphatic alcohol mixture; from 0.1% to 1.5% by weight of at least one component independently selected from the group consisting of buffers, biocides, and metal chelators; and from 68.5% to 91.7% of water.

Alternatively, the present invention provides an ink-jet ink for ink-jet printing, comprising from 0.1% to 5% by weight of at least one dye; from 8% to 20% by weight of an organic solvent selected from the group consisting of 1,2-pentanediol, 1,2-hexanediol, and combinations thereof; from 0.1% to 5% by weight of an aliphatic alcohol or aliphatic alcohol mixture; and from 0.1% to 1.5% by weight of at least one component independently selected from the group consisting of buffers, biocides, and metal chelators, with the proviso that no surfactant is present in the ink-jet ink composition.

DETAILED DESCRIPTION OF THE INVENTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "a dye" includes reference to one or more of such dyes.

As used herein, "effective amount" refers to the minimal amount of a substance or agent, which is sufficient to achieve a desired result. For example, an effective amount of an "ink vehicle" is the minimum amount required in order to create an ink composition, while maintaining properties necessary for effective ink-jetting.

As used herein, "ink vehicle," refers to the composition in which dyes are added to provide ink-jet ink compositions. Ink vehicles are well known in the art, and a wide variety of ink vehicles may be used with the systems, methods, and ink composition of the present invention. However, with the present invention, the ink-vehicle is defined by specific components in specific amounts, and excludes common additives such as surfactants.

An "ink-jet ink" or "ink composition" comprises an ink vehicle, a dye, and water.

In one embodiment, the present invention provides an ink-jet ink for ink-jet printing, consisting of from 0.1% to 5% by weight of at least one dye; from 8% to 20% by weight of an organic solvent selected from the group consisting of 1,2-pentanediol, 1,2-hexanediol, and combinations thereof; from 0.1% to 5% by weight of an aliphatic alcohol or aliphatic alcohol mixture; from 0.1% to 1.5% by weight of at least one component independently selected from the group consisting of buffers, biocides, and metal chelators; and from 68.5% to 91.7% of water. In another embodiment, the present invention provides an ink-jet ink for ink-jet printing, comprising from 0.1% to 5% by weight of at least one dye; from 8% to 20% by weight of an organic solvent selected from the group consisting of 1,2-pentanediol, 1,2-hexanediol, and combinations thereof; from 0.1% to 5% by weight of an aliphatic alcohol or aliphatic alcohol mixture; and from 0.1% to 1.5% by weight of at least one component independently selected from the group consisting of buffers, biocides, and metal chelators, with the proviso that no surfactant is present in the ink-jet ink composition. Notably absent from these ink-jet ink compositions is the presence of any traditional surface active agents such as anionic or nonionic surfactants.

Turning to a discussion of each component of the ink-jet ink compositions of the present invention, one component that must be present is an aliphatic alcohol or aliphatic alcohol mixture. Preferably, the aliphatic alcohol can comprise from 3 to 9 carbon atoms. In particular, the use of neopenyl alcohol and/or 3,5-dimethyl-1-hexyn-3-ol are preferred. It has been recognized by the inventors that, in accordance with the formulations of the present invention, the addition of such alcohols can improve dot gain, dot size, and ultimately, image quality.

With respect to the use of appropriate organic solvents of the present invention, preferred organic solvents can be selected from a group consisting of 1,2-hexanediol, 1,2-pentanediol, and combinations thereof. Of these two organic solvents, 1,2-hexanediol, in most circumstances, is the most preferred solvent for use. Though from 8% to 20% by weight circumscribes a broad range that can be used, as a practical matter the organic solvent is preferably present at from about 8% to about 13% by weight. The concentration of the organic solvent within the ink-jet ink composition is important as a goal of the present invention is to provide ink-jet ink formulations having good dot size, color-to-color bleed alleviation, improved coalescence, less chia (solvent and dye migration at the beginning of a swath), and improved print head materials compatibility.

Additional components must also be present in the ink-jet ink formulations of the present invention. For example, the present invention must have at least one component independently selected from the group consisting of buffers, metal chelators, and biocides. In one embodiment, one of each component is present.

Specifically, buffers can be used in the practice of the present invention to modulate pH. These buffers can be organic-based biological buffers or inorganic buffers. However, the preferred buffers for use can be organic-based buffers. In the ink-jet ink arts, a pH of around neutral is often desired for certain applications. For example, a pH ranging from 3 to 9 can be preferred. More specifically, in some embodiments, a pH from 6.5 to 8 can be desired. The buffers of the present invention can be used to achieve such pH levels.

Examples of buffers that can be used include, but are not limited to TRIZMA base, available from Aldrich Chemical, 4-morpholineethanesulfonic acid (MES), and 4-morpholinepropanesulfonic acid (MOPS). In one embodiment, 4-morpholinepropanesulfonic acid is a preferred buffer that can be used.

The ink-jet inks of the present invention can comprise 0.1% to about 1.5% by weight of a buffer. However, if other components are present (chelator and/or biocide), then less than 1.5% will be present. Thus, more preferably, the biocide will be present in the ink-jet ink compositions at from 0.1% to about 0.5% by weight, with a concentration from about 0.1% to about 0.3% being even more preferred.

Turning to the metal chelator component, such metal chelators that are capable of binding transition metal cations can be present. A classic metal chelator known in the chemical arts is ethylenediaminetetraacetic acid (EDTA), which can be added to the ink-jet inks of the present invention. Other metal chelators can also be added such as diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal cations. Ethylenediaminetetraacetic acid (EDTA) and diethylenetriaminepentaacetic acid (DTPA) are more preferred metal chelators that can be used. Particularly, the use of ethylenediaminetetraacetic acid (EDTA) in its disodium salt form can be employed in the practice of the invention with good results.

If a metal chelator is used, then from 0.1% about 1.5% by weight can be present in the formulation. However, if other components are present (buffer and/or biocide), then less than 1.5% will be present. Thus, more preferably, the metal chelator will be present in the ink-jet ink compositions at from 0.1% to about 0.5% by weight, with a concentration from about 0.1% to about 0.3% being even more preferred.

Any of the biocides commonly used in ink-jet inks can also be used in the formulations of the present invention, provided the biocide does not substantially adversely affect the properties that are being sought with the present invention, e.g., good dot size, color-to-color bleed alleviation, improved coalescence, less chia, and improved print head materials compatibility. Examples of biocides that can be used include, but are not limited to, NUOSEPT 95, available from Huls America; PROXEL GXL, available from Zeneca; and glutaraldehyde, available from Union Carbide Company under the trade designation UCARCIDE 250. The use of PROXEL GXL is preferred.

The inks of the present invention can comprise from 0.1% to 1.5% by weight of a biocide. However, if other components are present (buffer and/or metal chelator), then less than 1.5% will be present. Thus, more preferably, the biocide will be present in the ink-jet ink compositions at from 0.1% to about 0.5% by weight, with a concentration from about 0.1% to about 0.3% being even more preferred.

Turning now to the colorants that can be used with the ink-jet ink compositions of the present invention, any dye can be used that provides a desired color to the ink-jet ink, while not substantially diminishing the properties that are desired to be achieved with the present invention. Thus, the solubility of the dye in the ink vehicle and the intensity of the color should be considered when selecting an appropriate dye. In the context of the present invention, the dye should be present in the ink-jet ink formulation at from about 0.1% to 5% by weight. The dyes can be colored or black dyes, depending on the application or desired use. Examples of dyes that can be used include, but are not limited to, Direct Blue 199 (available form Zeneca Colors as Projet Cyan Special), Direct Red 9, Direct Red 227, Magenta 377 (available from Ilford AG, Rue de l'Industrie, CH-1700 Fribourg, Switzerland), Acid Yellow 23, Direct Yellow 86, Yellow 104 (Ilford AG), Direct Yellow 4 (BASF), Yellow PJY H-3RNA (Zeneca Colors), Direct Yellow 50 (Zenceca Colors), Pacified Reactive Black 31, and other similar dyes. The most preferred dyes for use include, Direct Blue 199, Magenta 377, Ilford Yellow 104, and Pacified Reactive Black 31. Thus, one of each color, i.e., cyan, magenta, and yellow, and black ink-jet inks can be formulated for use.

EXAMPLES

The following examples illustrate the preferred embodiments of the invention that are presently best known. However, other embodiments can be practiced that are also within the scope of the present invention.

Example 1

A cyan inkjet ink was prepared according to the following formulation (each by weight):

| | |
|---|---|
| 1.50% | Direct Blue 199 |
| 0.10% | ethylenediaminetetraacetic acid (EDTA) (metal chelator) |
| 0.15% | 4-morpholinepropanesulfonic acid (MOPS) (buffer) |
| 0.20% | PROXEL GXL (biocide) |
| 9.25% | 1,2-hexanediol |
| 0.50% | neopentyl alcohol |
| balance | water |

Example 2

A cyan ink-jet ink was prepared according to the following formulation (each by weight):

| | |
|---|---|
| 1.50% | Direct Blue 199 |
| 0.10% | ethylenediaminetetraacetic acid (EDTA) (metal chelator) |
| 0.15% | 4-morpholinepropanesulfonic acid (MOPS) (buffer) |
| 0.20% | PROXEL GXL (biocide) |
| 11.25% | 1,2-hexanediol |
| 0.50% | neopentyl alcohol |
| balance | water |

Example 3

A cyan ink-jet ink was prepared according to the following formulation (each by weight):

| | |
|---|---|
| 1.50% | Direct Blue 199 |
| 0.10% | ethylenediaminetetraacetic acid (EDTA) (metal chelator) |
| 0.15% | 4-morpholinepropanesulfonic acid (MOPS) (buffer) |
| 0.20% | PROXEL GXL (biocide) |
| 9.25% | 1,2-hexanediol |
| 1.50% | 3,5-dimethyl-1-hexyn-3-ol |
| 0.50% | neopentyl alcohol |
| balance | water |

Example 4

A black ink-jet ink was prepared according to the following formulation (each by weight):

| | |
|---|---|
| 1.48% | Pacified Reactive Black 31 |
| 0.10% | ethylenediaminetetraacetic acid (EDTA) (metal chelator) |
| 0.15% | 4-morpholinepropanesulfonic acid (MOPS) (buffer) |
| 0.20% | Proxel GXL (biocide) |
| 9.25% | 1,2-hexanediol |
| 0.50% | neopentyl alcohol |
| balance | water |

Example 5

A yellow ink-jet ink was prepared according to the following formulation (each by weight):

| | |
|---|---|
| 3.00% | Yellow 104 |
| 0.10% | ethylenediaminetetraacetic acid (EDTA) (metal chelator) |
| 0.15% | 4-morpholinepropanesulfonic acid (MOPS) (buffer) |
| 0.20% | PROXEL GXL (biocide) |
| 9.25% | 1,2-hexanediol |
| 0.50% | neopentyl alcohol |
| balance | water |

Example 6

A magenta ink-jet ink was prepared according to the following formulation (each by weight):

| | |
|---|---|
| 2.35% | Magenta 377 |
| 0.10% | ethylenediaminetetraacetic acid (EDTA) (metal chelator) |
| 0.15% | 4-morpholinepropanesulfonic acid (MOPS) (buffer) |
| 0.20% | PROXEL GXL (biocide) |
| 9.25% | 1,2-hexanediol |
| 0.50% | neopentyl alcohol |
| balance | water |

Example 7

Evaluation of Print Quality (Dot Size)

To evaluate dot size, dots were placed on a gelatin coated ink-jet media (H-P Photosmart Glossy, C5982A) by ejecting single dots from an ink-jet photo printer. Generally speaking, a dot size from about 80 to 110 microns can be desired when using this printer/media combination at 1200 dpi. Smaller dot sizes tend to lead to images having inferior quality due to either or both insufficient covering of the pixels and lack of hiding power for the printing defects, e.g., misfiring of nozzles. Conversely, larger dot sizes tend to exhibit blurry and ill-defined images. Specifically, dot size was evaluated visually under the microscope. The following table illustrates the dot size in microns for each ink-jet ink prepared in Examples 1–6.

TABLE 1

| INK-JET INK | DOT SIZE ($\mu$m) |
|---|---|
| Example 1 | 110 |
| Example 2 | 94 |
| Example 3 | 102 |
| Example 4 | 109 |
| Example 5 | 111 |
| Example 6 | 108 |

Table 1 above shows that by utilizing the formulations of Examples 1–6, acceptable dot size compared to an optimal dot size can be achieved.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. An ink-jet ink for ink-jet printing, consisting of:
    from 0.1% to 5% by weight of at least one dye;
    from 8% to 20% by weight of an organic solvent selected from the group consisting of 1,2-pentanediol, 1,2-hexanediol, and combinations thereof;
    from 0.1% to 5% by weight of an aliphatic alcohol or aliphatic alcohol mixture;
    from 0.1% to 1.5% by weight of at least one component independently selected from the group consisting of buffers, biocides, and metal chelators; and
    from 68.5% to 91.7% by weight of water.

2. An ink-jet ink as in claim 1 wherein the aliphatic alcohol or aliphatic alcohol mixture comprises alcohols having from 3 to 9 carbon atoms.

3. An ink-jet ink as in claim 2 wherein the aliphatic alcohol is neopentyl alcohol.

4. An ink-jet ink as in claim 2 wherein the aliphatic alcohol is 3,5-dimethyl-1-hexyn-3-ol.

5. An ink-jet ink as in claim 1 wherein the organic solvent is 1,2-hexanediol.

6. An ink-jet ink as in claim 1 wherein the organic solvent is present in an amount from about 8% to about 13% by weight.

7. An ink-jet ink as in claim 1 wherein at least one of each component selected from the group consisting of buffers, biocides, and metal chelators is present.

8. An ink-jet ink as in claim 1 having a pH ranging from 3 to about 9.

9. An ink-jet ink as in claim 8 having a pH ranging from 6.5 to about 8.

10. An ink-jet ink for ink-jet printing, comprising:
    from 0.1% to 5% by weight of at least one dye;
    from 8% to 20% by weight of an organic solvent selected from the group consisting of 1,2-pentanediol, 1,2-hexanediol, and combinations thereof;
    from 0.1% to 5% by weight of an aliphatic alcohol or aliphatic alcohol mixture; and
    from 0.1% to 1.5% by weight of at least one component independently selected from the group consisting of buffers, biocides, and metal chelators,
    with the proviso that no surfactant is present in the ink-jet ink.

11. An ink-jet ink as in claim 10 wherein the aliphatic alcohol or aliphatic alcohol mixture comprises alcohols having from 3 to 9 carbon atoms.

12. An ink-jet ink as in claim 11 wherein the aliphatic alcohol is neopentyl alcohol.

13. An ink-jet ink as in claim 11 wherein the aliphatic alcohol is 3,5-dimethyl-1-hexyn-3-ol.

14. An ink-jet ink as in claim 10 wherein the organic solvent is 1,2-hexanediol.

15. An ink-jet ink as in claim 10 wherein the organic solvent is present in an amount from about 8% to about 13% by weight.

16. An ink-jet ink as in claim 10 wherein at least one of each component selected from the group consisting of buffers, biocides, and metal chelators is present.

17. An ink-jet ink as in claim 10 having a pH ranging from 3 to about 9.

18. An ink-jet ink as in claim 17 having a pH ranging from 6.5 to about 8.

* * * * *